United States Patent [19]

Kitamura

[11] Patent Number: 4,996,754
[45] Date of Patent: Mar. 5, 1991

[54] PALLET CHANGER

[75] Inventor: Koichiro Kitamura, Takaoka, Japan

[73] Assignee: Kitamura Machinery Co., Ltd., Takaoka, Japan

[21] Appl. No.: 434,674

[22] PCT Filed: Apr. 25, 1988

[86] PCT No.: PCT/JP88/00400
§ 371 Date: Oct. 27, 1989
§ 102(e) Date: Oct. 27, 1989

[87] PCT Pub. No.: WO88/08770
PCT Pub. Date: Nov. 17, 1988

[30] Foreign Application Priority Data

May 7, 1987 [JP] Japan .................. 62-109837

[51] Int. Cl.$^5$ .................. B23Q 7/00; B65G 47/00
[52] U.S. Cl. .................. 29/33 P; 198/346.1
[58] Field of Search .................. 29/33 P, 563, 564; 198/346.1, 345, 465.1, 465.2, 339.1; 414/509, 523

[56] References Cited

U.S. PATENT DOCUMENTS

| 4,172,512 | 10/1979 | Clegg et al. | 29/33 P X |
| 4,423,806 | 1/1984 | Ogasawara | 198/346.1 |
| 4,449,277 | 5/1984 | Hasegawa et al. | 29/33 P |
| 4,799,582 | 1/1989 | Itoh | 198/346.1 |

FOREIGN PATENT DOCUMENTS

| 265580 | 3/1989 | Fed. Rep. of Germany | 198/346.1 |
| 57-173938 | 11/1982 | Japan | 29/33 P |
| 61-13937 | 4/1986 | Japan | 29/33 P |
| 256332 | 10/1988 | Japan | 198/346.1 |
| 8810169 | 12/1988 | World Int. Prop. O. | 198/346.1 |

Primary Examiner—William Briggs
Attorney, Agent, or Firm—Wegner, Cantor, Mueller & Player

[57] ABSTRACT

This invention relates to a pallet changer suitable for use with a machine tool. When exchanging pallets, the pallet changer employs a drive means 3 for driving a table 2, and a transfer means 12 comprising a chain 66 and sprockets 64, 65. The transfer means 12 is driven by the drive means 3, and the pallet 4 is moved in the same direction as the table 2.

11 Claims, 16 Drawing Sheets

PALLET CHANGER

BACKGROUND OF THE INVENTION

This invention relates to a pallet changer suitable for use with a machine tool.

FMS(flexible manufacturing system) has a machine tool and a pallet changer. The pallet changer exchanges a pallet on a table of the machine tool for another pallet. The conventional pallet changer is a hydraulic cylinder type or a chain type.

In the case of the pallet changer being of a hydraulic cylinder type, a rod of the hydraulic cylinder is extended so that a pallet is settled on the table of the machine tool. After a work on the pallet is machined, the rod is contracted so that the pallet is returned.

In the case of the pallet changer being of a chain type, a plurality of pallets are set to the chain at regular intervals. The chain is driven by a motor so that the pallet is transfered to a pallet changing place near the table of the machine tool.

But, the pallets and the works are considerably heavy. In the case of the pallet changer being of a hydraulic cylinder type, a large hydraulic cylinder is needed. In the case of the pallet changer being of a chain type, a large motor and a big chain are needed. In both cases, the pallet changer is big in size and its construction is complicated.

When the large hydraulic cylinder or the large motor in the pallet changer starts or stops, the pallet changer is shocked. The shock is caused by the inertia of the heavy pallets and the works on the pallets. To avoid the shock, the large hydraulic cylinder and the large motor must be slowly operated.

The object of this invention is to provide an improved pallet changer whose construction is simple. When this pallet changer is used, large cost saving are obtained.

A pallet changer according to this invention, for example, is constructed as follows.

FIG. 1 shows the pallet changer PC comprising a work carrier pallet 4 detachably and movably mounted to a table 2, and another work carrier pallet 14 set at a separate location (pallet table 30 in an embodiment of FIG. 2). The table 2 is provided on a support 1 (a support of machine tool in this embodiment) of the pallet changer. The table 2 moves along at least a first axis (the X-axis in this embodiment). The table 2 can reciprocately move along the first axis by means of drive means 3 such as a servomotor. The work carrier pallet 4 is detachably mounted to the table 2, and the work carrier can move on the table 2.

A transfer means 12 transfers the work carrier pallet 4 on the table 2 in a first direction of arrow X1 and a second direction of arrow X2 opposite to the first direction. The pallet 4 moves by a drive power means 3 when the table 2 moves in the first direction of arrow X1 or the second direction of arrow X2.

Pallet 4 is transfered by the drive means 3 only. No other drive means such as a hydraulic cylinder and a motor is required.

The transfer means 12 has a guide body 62, a slide body 69, a first and a second sprocket 64, 65, a chain 66, an engagement means 67 and a mechanism part 100.

The slide body 69 is supported by the guide body 62 fixed to the table 2 and can slide along the first axis. The first sprocket 64 and the second sprocket 65 are provided to one portion and another portion of the slide body 69.

The chain 66 is set between the first and the second sprockets 64, 65.

By means of the engagement means 67, the chain 66 detachably engages the work carrier pallet 4.

When the table 2 moves in the first direction of arrow X1 or in the second direction of arrow X2 by means of drive means 3, the mechanism part 100 drives the chain 66 so that the slide body 69 slides in the first direction of arrow X1 or in the second direction of arrow X2 relative to the table 2. Accordingly, the work carrier pallet 4 slides on the table 2 in the first direction of arrow X1 or in the second direction of arrow X2.

In the pallet changer according to this invention, the pallet moves in the same direction as the table's movement by means of the simple drive means such as the chain and the sprockets, so that a large hydraulic cylinder and a large motor are not required. The construction of the pallet changer according to this invention is simple and the pallet changer is small in size. Using the pallet changer according to this invention, large cost saving can be obtained.

BRIEF DESCRIPTION OF DRAWINGS

FIG. 5 is a front view showing a transfer means and so on.

BEST MODE FOR CARRYING OUT THE INVENTION

Figure 1:
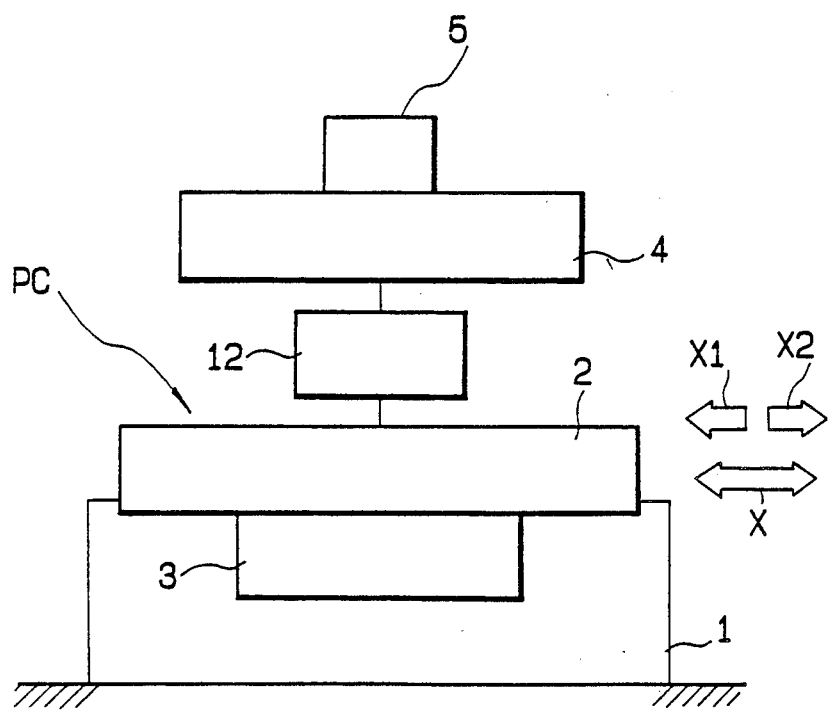
FIG. 1 is a diagrammatic view showing a pallet changer according to this invention.

In FIG. 1 the pallet changer PC has a support 1 of a machine tool, a table 2, a drive means 3, a work carrier pallet 4 and a transfer means 12.

The support 1 is settled on a floor. The table 2 is provided on the support 1. A work 5 is fixed to the work carrier pallet (hereinafter called the pallet for short) 4. The pallet 4 is mounted to the table 2 and movably along the X-axis.

The table 2 can move along the X-axis, or in a first direction of arrow X1 or in a second direction of arrow X2 opposite to the first direction, by means of drive means 3 relative to the support 1. The transfer means 12 transfers the pallet 4 on the table 2 in the first direction of arrow X1 or in the second direction of arrow X2 when the table 2 moves in the first direction of arrow X1 or in the second direction of arrow X2.

Figure 2:
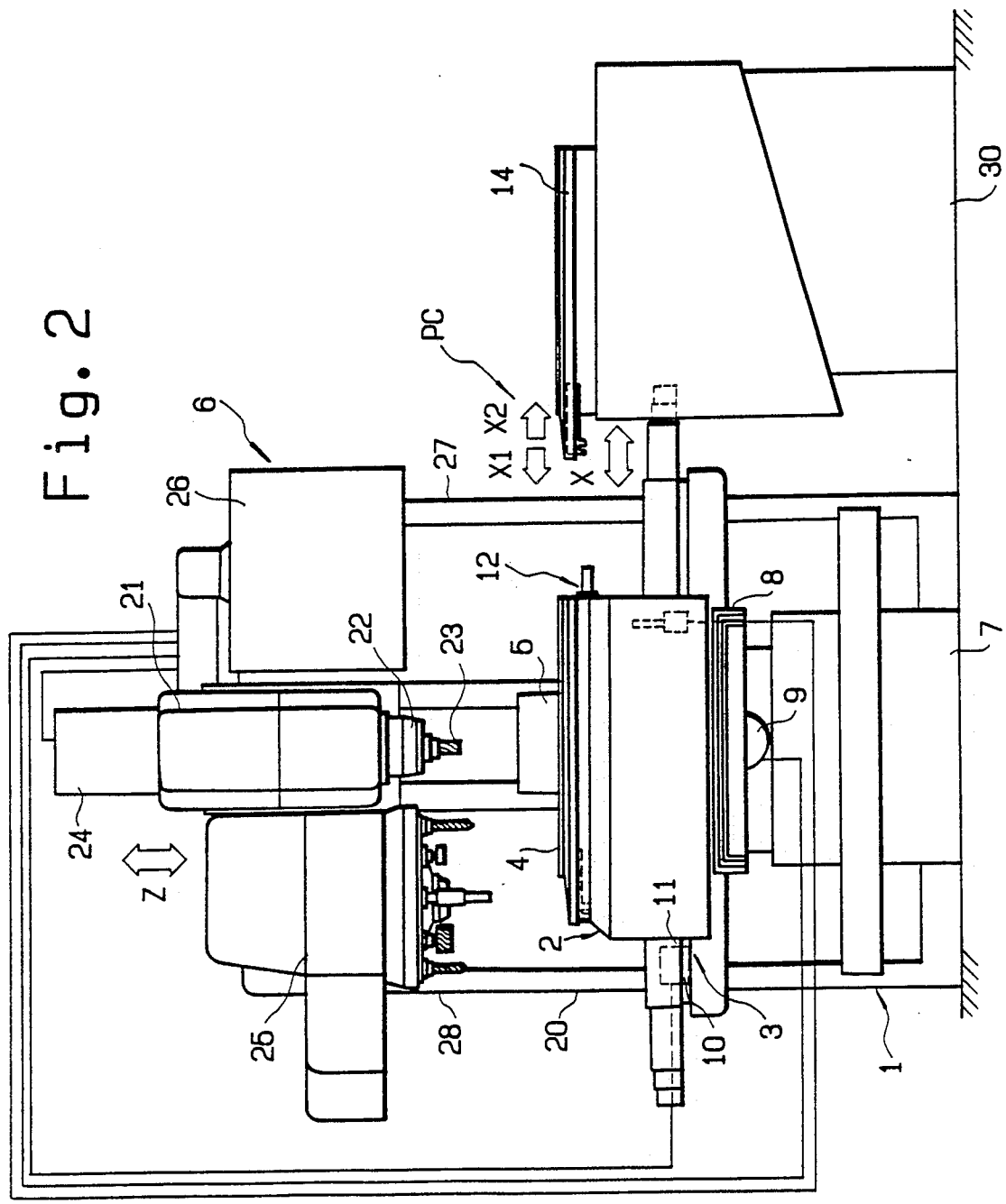
FIG. 2 is a front view showing a machining center equipped with a pallet changer according to this invention.

FIG. 2 shows a vertical machining center equipped with the pallet changer according to this invention. The support 1 has a bed 7 and a saddle 8. A servomotor 9 (for a movement along the Y-axis) is attached to the bed.

The drive means 3 has a servomotor 10 (for a movement along the X-axis) and a ball screw 11. The table 2 is attached on the saddle 8. The pallet 4 is mounted to the table 2 detachably and movably along the X-axis. The transfer means 12 is provided near the table 2.

A column 20 has a spindle head 21. A tool 23 is attached to a spindle 22 of the spindle head 21. The spindle 22 rotates by means of a motor 24. The spindle head has a automatic tool changer 25. The column 20 also has a control panel 26, a CNC unit 27 and a control board 28.

The table 2 can move in the first direction of arrow X1 or in the second direction of arrow X2 by means of servomotor 10. A pallet table 30 is placed beside the table 2. Another pallet 14 is placed on the pallet table 30.

Figure 3:
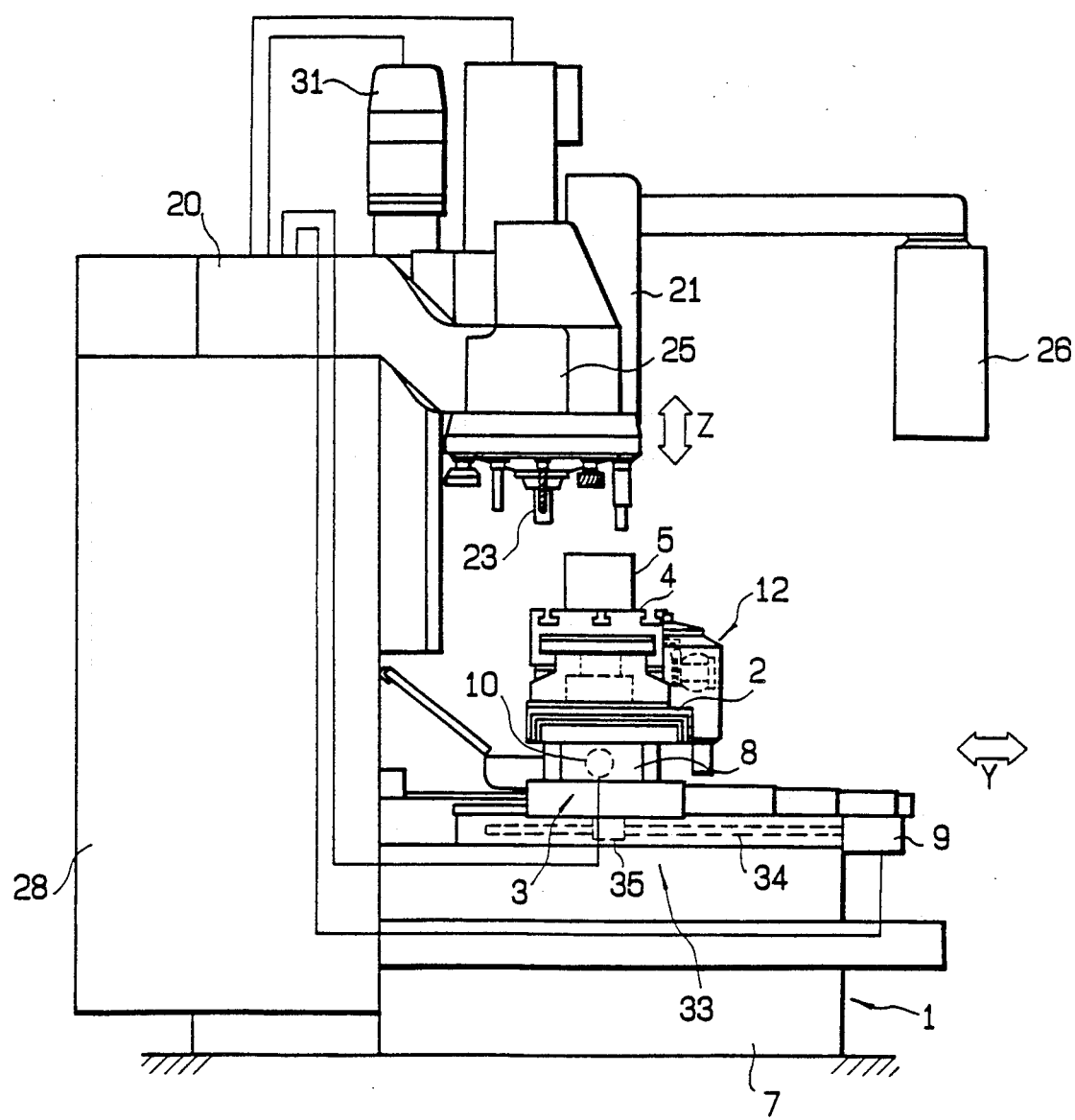
FIG. 3 is a side view showing the machining center.

In FIG. 3, a feed screw 34 of a ball screw part 33 is connected to the servomotor 9. The feed screw engages a nut 35. The nut 35 is mounted to the under portion of the saddle 8 so that the the saddle 8 can move along the X-axis by means of the servomotor 9. The spindle head 21 can move along the Z-axis by means of a servomotor 31. FIG. 3 shows a part of the transfer means 12, which is hereinafter explained.

Figure 4:
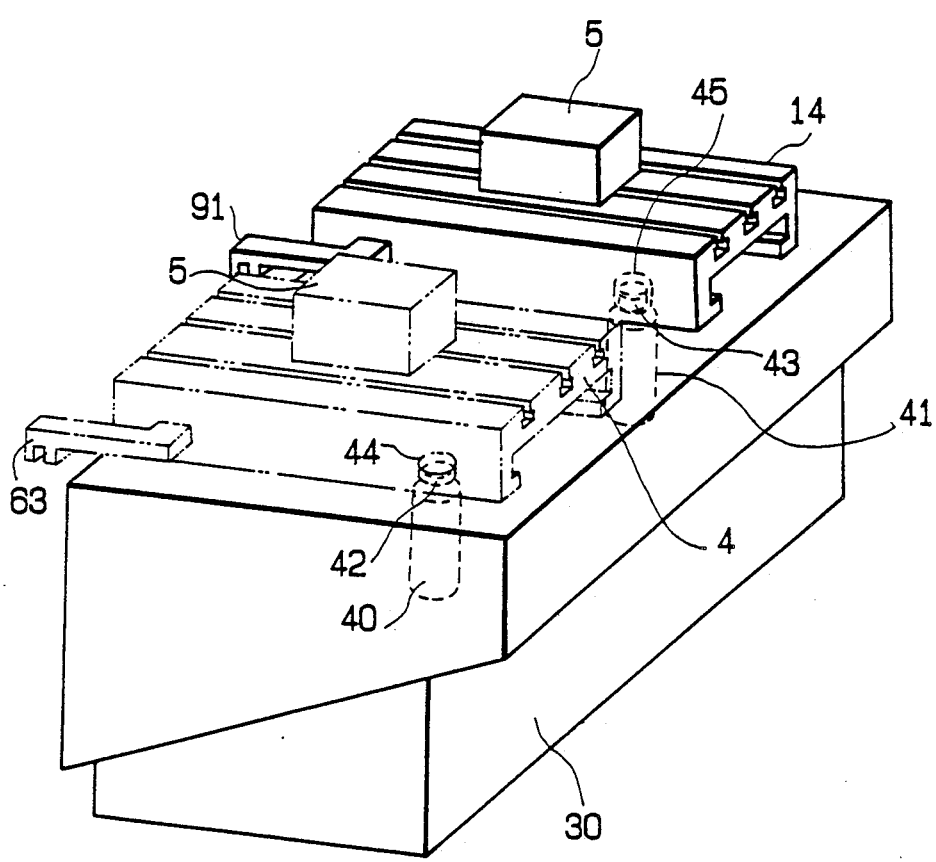
FIG. 4 is a perspective view showing a pallet table.

FIG. 4 illustrates that the pallets 4 and 14 can be set side by side on the pallet table 30. The work 5 is fixed to the pallet 4 and another work 5 is fixed to the pallet 14. The pallet table 30 is equipped with two air cylinders 40, 41. Each air cylinder 40, 41 has a stopper pin 42, 43. Each stopper pin 42, 43 can be inserted into a hole 44, 45 of the pallet 4, 14. Thus, the pallet 4, 14 is placed in precise position. When the pallet 4, 14 is transfered, the stopper pin 42, 43 is extracted from the hole 44, 45.

A pallet hook 63 is attached to the front portion of the pallet 4 along the longitudinal direction of the pallet 4. A pallet hook 91 is attached to the pallet 14 in the same way.

Figure 5:
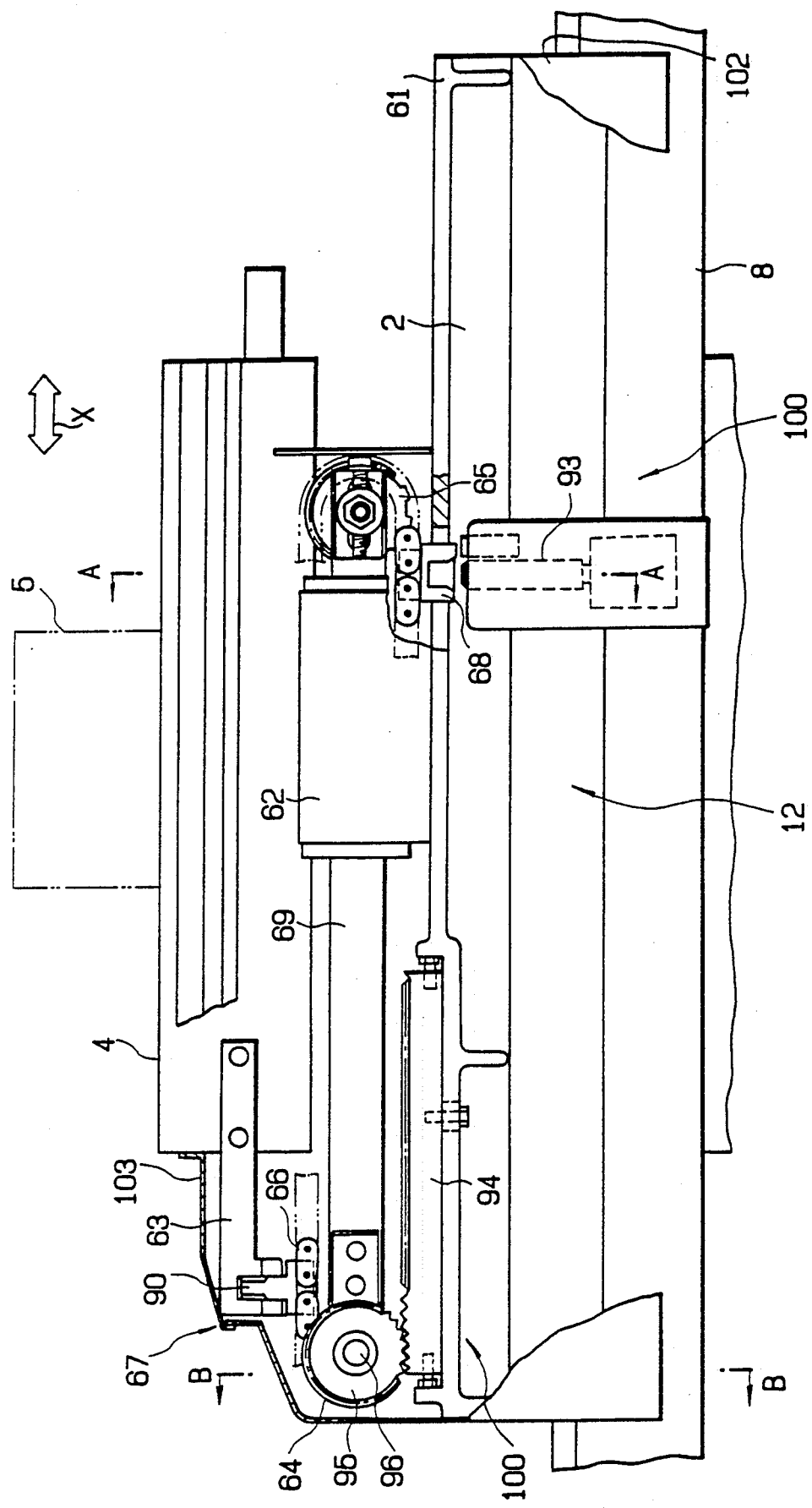
Figure 6:
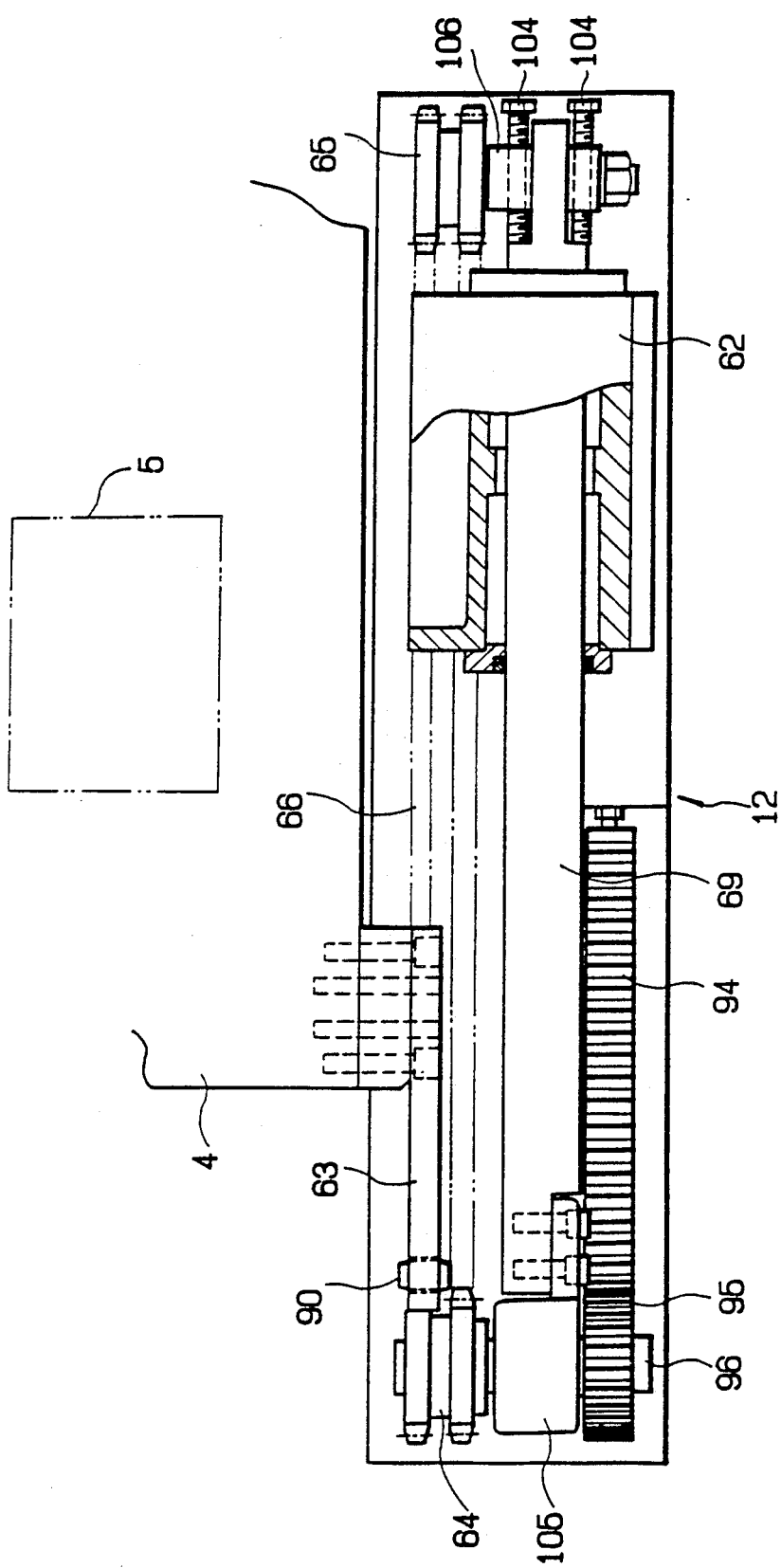
FIG. 6 is a top view showing the transfer means.
Figure 7:
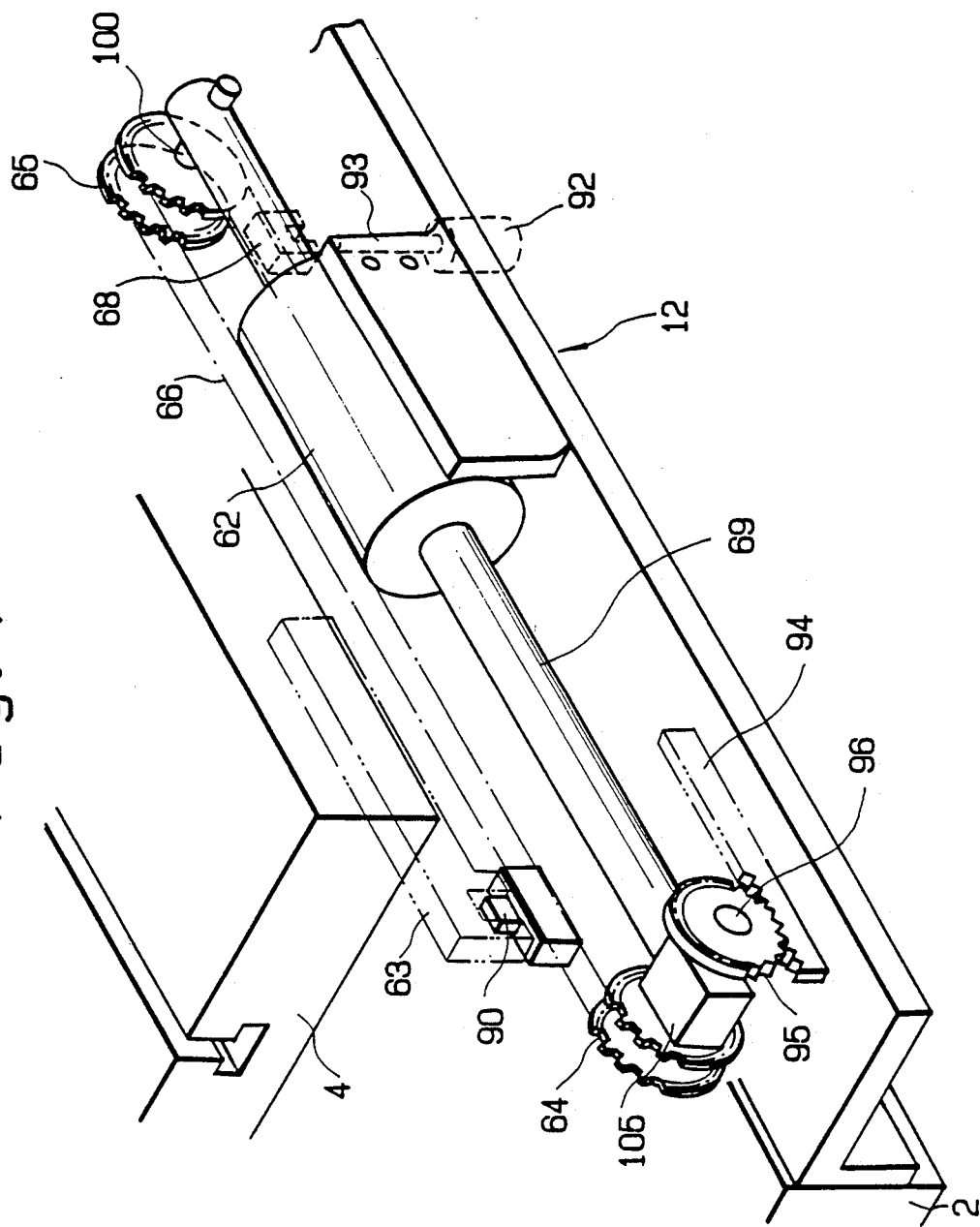
FIG. 7 is a perspective view showing the transfer means.

FIG. 5 shows the saddle 8, the table 2, the pallet 4 which is also called a pallet table, and the transfer means 12. FIG. 6 shows the transfer means 12. FIG. 7 is a perspective view showing the transfer mean 12.

FIG. 5 shows that the transfer means 12 has a guide body 62, a slide body 69, an engagement means 67, a chain 66, a first and a second sprocket 64 and 65, and a mechanism portion 100.

The guide body 62 is fixed to a base bracket 61. The base bracket is fixed to the table 2. The cylindrical slide body 69 is slidably supported by the guide body 62. The slide body 69 can slide along the X-axis.

The first and second sprocket is provided to one end and the other end of the slide body 69, respectively. The chain is provided between the sprockets 64 and 65.

The chain 66 has a chain hook 90 for engaging the engagement means 67 and a chain hook 68 for engaging the mechanism part 100. The engagement means comprises the pallet hook 63 and the chain hook 90. The chain hook 90 is fixed to the chain 66. The chain hook 90 of convex shape engages the pallet hook 63 of concave shape. When the pallet hook 63 moves along the Y-axis (FIG. 3) relative to the chain hook 90, the pallet hook 63 disengages from the chain hook 90. The Y-axis is perpendicular to the X-axis.

The chain hook 68 of concave shape is located above a stopper cylinder 92. The stopper cylinder 92 is upwardly fixed to the saddle 8. A pin 93 of the stopper cylinder 92 can be inserted into the chain hook 68.

A rack 94 is fixed to the base bracket 61 along the X-axis. The rack 94 engages a pinion 95. The pinion 95 and the sprocket 64 are connected to /or associated with to a shaft 96.

The mechanism part 100 comprises the pinion 95, the rack 94, the chain hook 68 and the stopper pin 92. A proximity sensor 101 is associated with to the stopper cylinder 92. When the proximity sensor 101 detects the position of the chain hook 68, the pin 93 of the stopper cylinder 92 expands according to a command signal from the CNC device 27 (FIG. 2).

The transfer mechanism 12 is covered by a cover 102. The pallet hook 63 is also covered by a cover 103. Because of these covers, cutting debris and a cutting oil cannot enter inside these covers.

FIGS. 6 and 7 show the chain 66, the slide body 69, the guide body 62, the rack 94, the pinion 95, the sprocket 64, 65. The shaft 96 is rotatably attached to a connecting part 105. The connecting part 105 is fixed to one end of the slide body 69.

A shaft 106 of the sprocket 65 is attached to the other end of the slide body 69. When the shaft is shifted by adjusting screws 104, 104, the tension of the chain 66 can be controlled.

Figure 8:
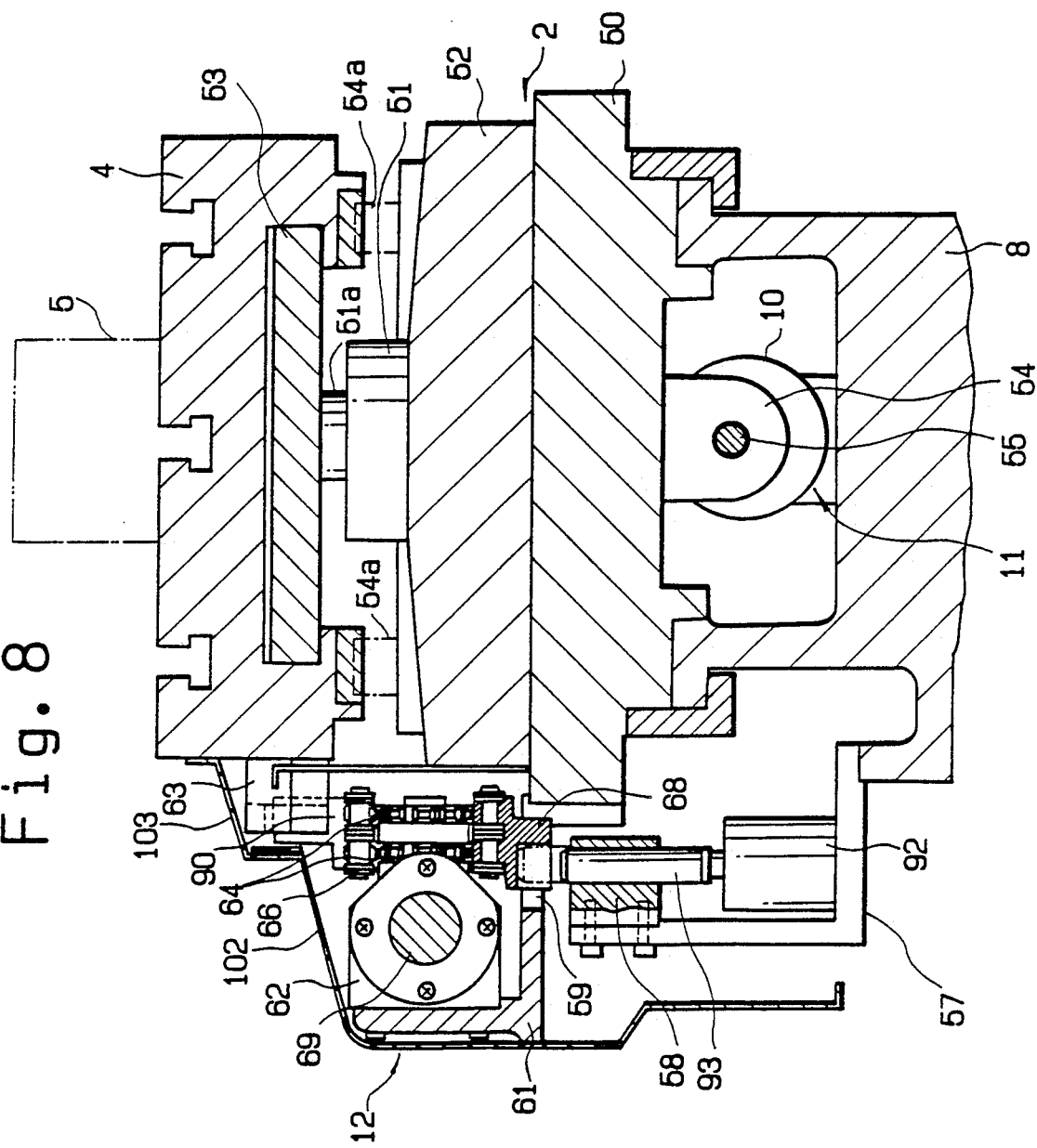
FIG. 8 is a sectional view taken along line A—A of FIG. 5, in which a pallet is clamped.

FIG. 8 is a sectional view taken along line A—A of FIG. 5. The table 2 in FIG. 8 has a slide portion 50, two clamp cylinder 51, a clamp unit 52, a clamp plate 53. The clamp unit 52 is fixed on the slide portion 50. One clamp cylinder 51 is located behind the other one. The clamp plate 53 is fixed to a rod 51a of the clamp cylinder 51. A nut 54 is fixed to an under surface of the slide portion 50. The feed screw 55 of the ball screw part 11 engages the nut 54. The feed screw 55 is connected to the servomotor 10.

In FIG. 8, the rod 51a of the clamp cylinder 51 is contracted. The clamp plate clamps the pallet 4 against pins 54a, 54a.

In FIG. 8, the transfer mechanism 12 comprises the chain 66, the sprocket 64, the slide body 69, the guide body 62, the chain hook 90, and the pallet hook 63. The clamp cylinder 92 is fixed to a bracket 57 which is fixed to the saddle 8. A pin 93 is guided by a pin guide 58. The chain hook 68 is located in a long groove 59 of the base bracket 61.

Figure 9:
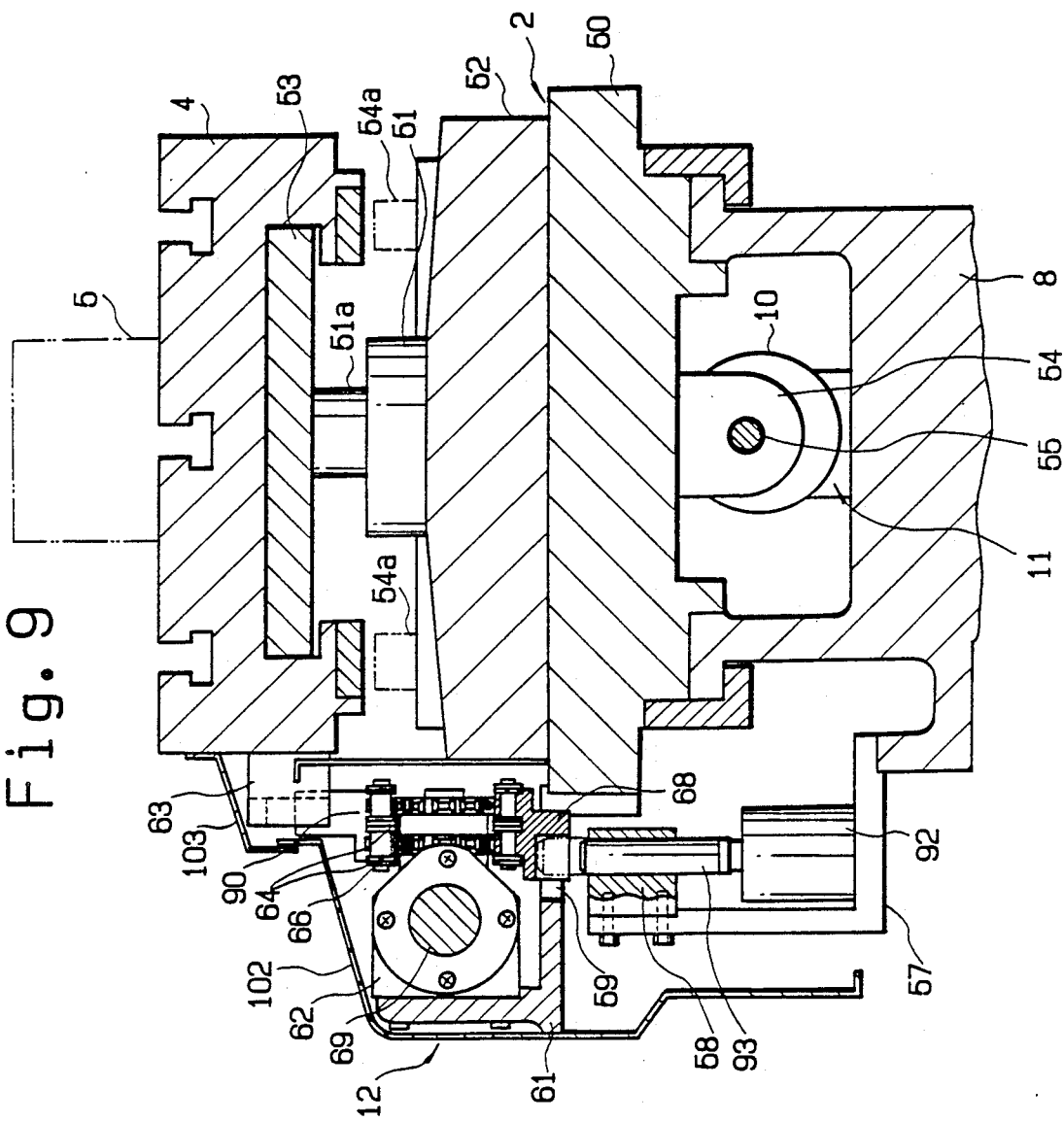
FIG. 9 is a sectional view in which the pallet is unclamped.

In FIG. 9, the rod 51a of the clamp cylinder 51 expands and the clamp plate 53 unclamps the pallet 4. In this condition, the table 2 can move along the saddle 8 by means of servomotor 10.

Figure 10:
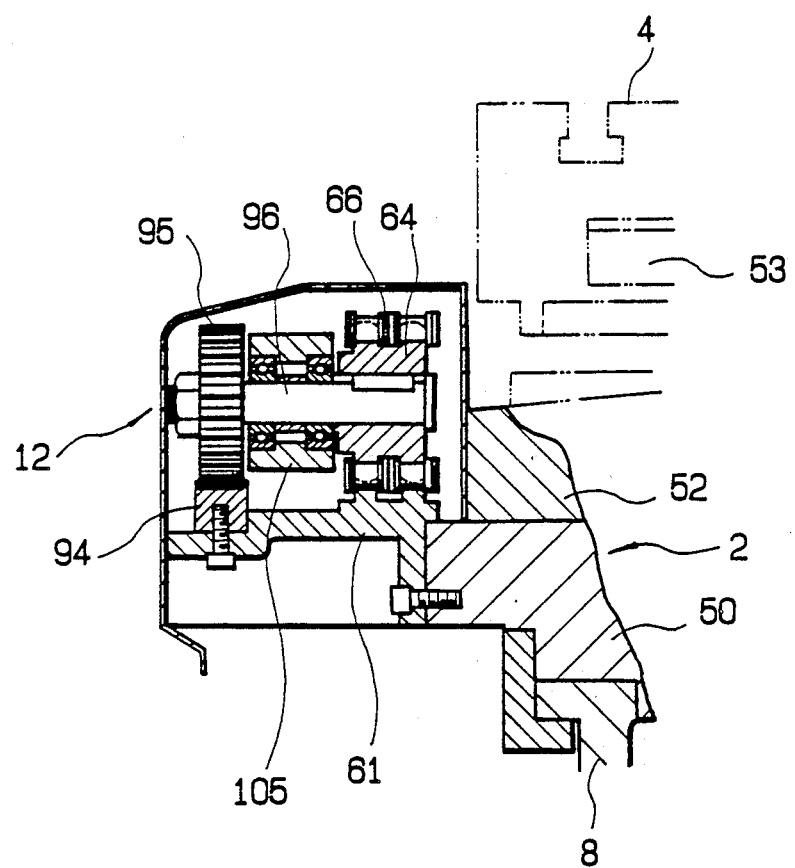
FIG. 10 is a sectional view taken along B—B of FIG. 5.

FIG. 10 is a sectional view taken along line B—B of FIG. 5. In FIG. 10, the transfer mechanism 12 has the pinion 95, the rack 94, a connecting portion 105, the chain 66, and the sprocket 64.

Figure 11:
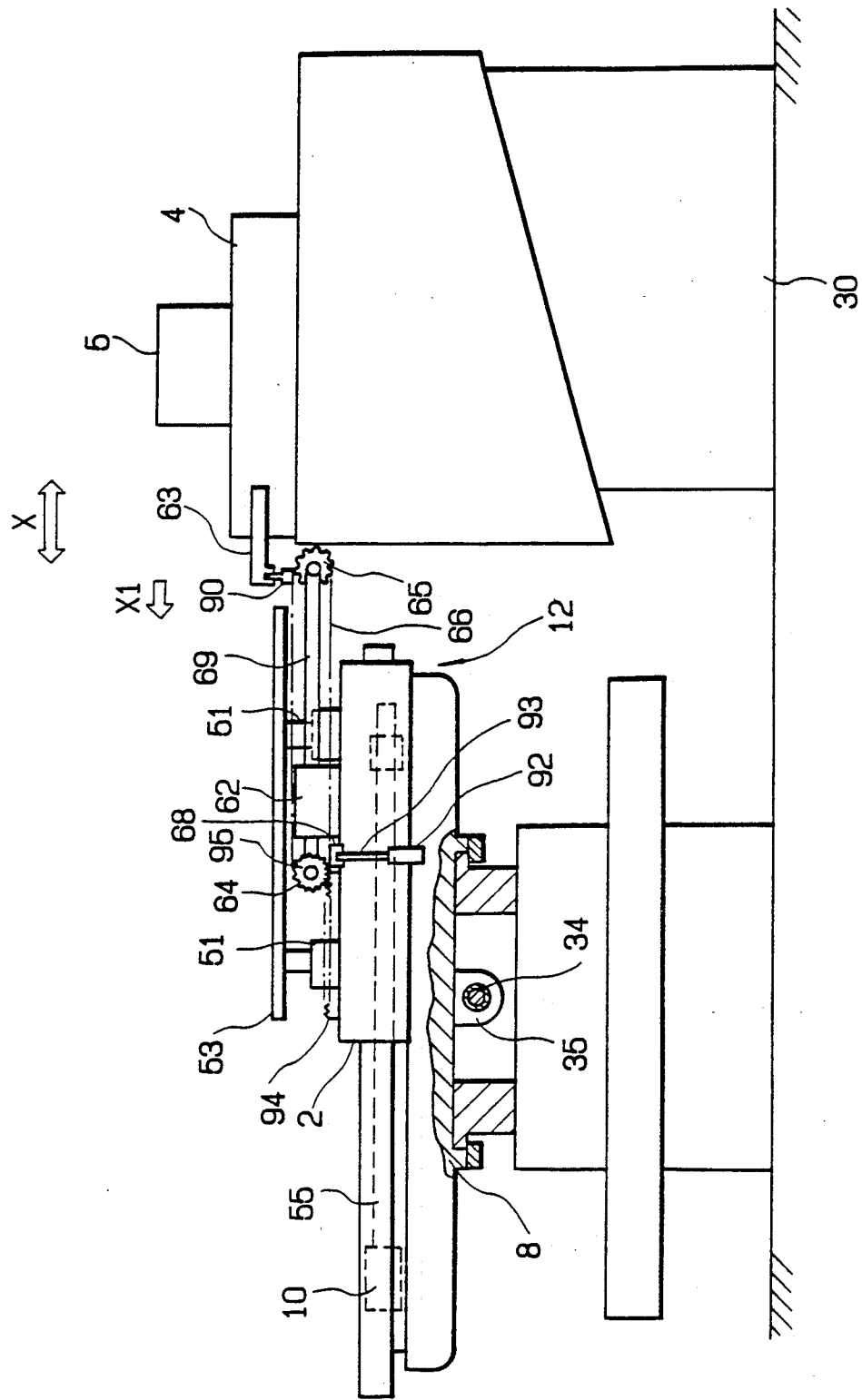
FIG. 11 is a view showing the pallets on the pallet table.

In FIG. 11, the pallet 4 is located on the pallet table 30. The table 2 is located at a right end of the saddle 8. The table 2 moves in the first direction of arrow X1 by means of the servomotor 10. In this case, the pin 93 of the clamp cylinder 92 engages the chain hook 68 of the chain 66. The chain 66 rotates in the counter-clockwise direction so that the pinion 95 moves on the rack 94 in the first direction of arrow X1. The slide body 69 moves in the first direction of arrow X1 relative to the guide body 62 or the table 2. When the chain hook 90 engages the pallet hook 63 and the table 2 moves in the first direction of arrow X1, the pallet 2 moves in the first direction of arrow X1 relative to table 2.

Figure 12:
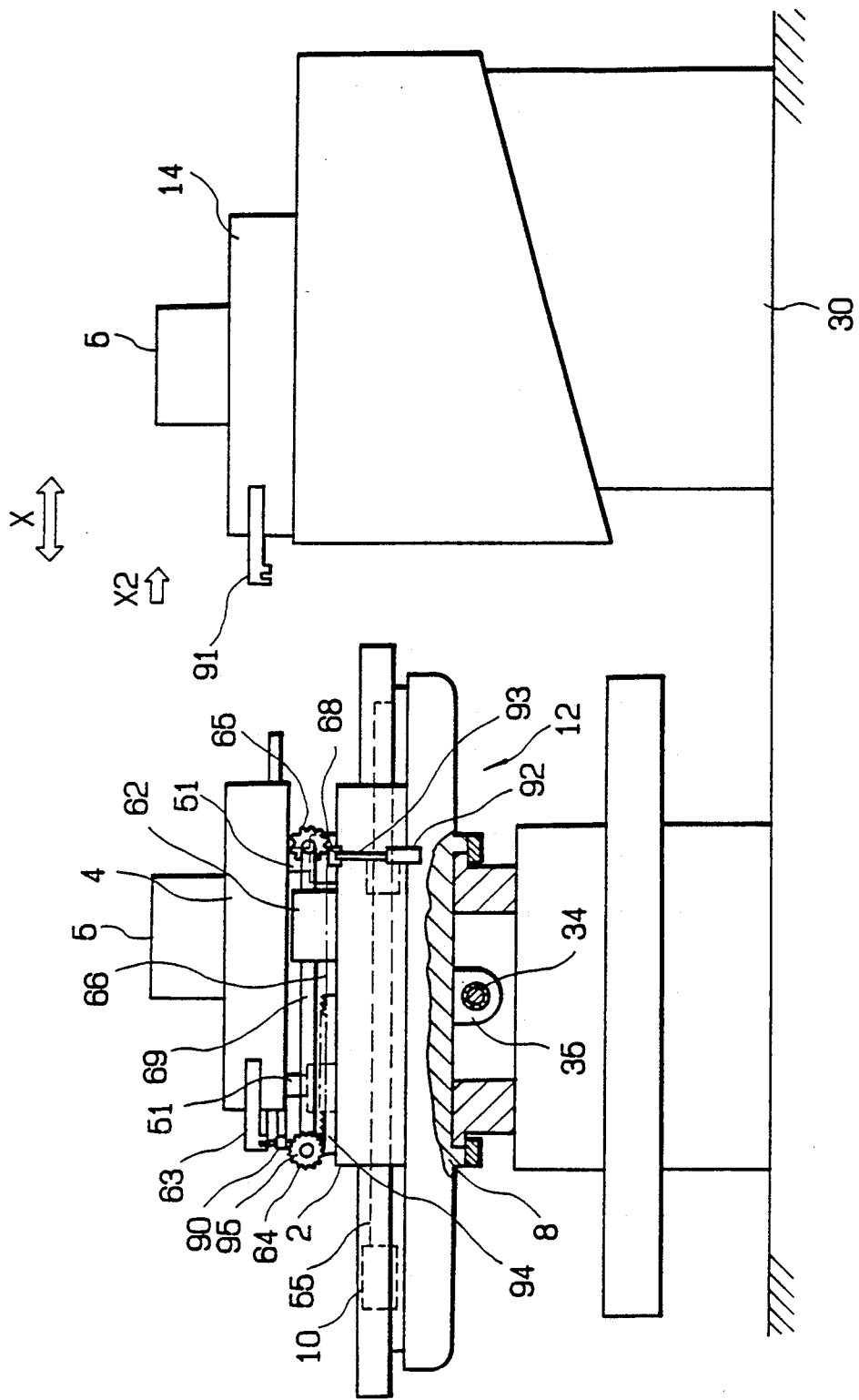
FIG. 12 is a view showing the pallet on the table.

In such a manner, the pallet 4 is transfered from pallet stand to the table 2 as shown in FIG. 12.

The pallet 4 is clamped at the table 2 as shown in FIG. 8. The pin 93 of the clamp cylinder 92 in FIG. 11 is removed from the chain hook 68. When the table moves along the X-axis to machine the work 5, the chain does not rotate. Accordingly, the pallet 4 does not move relative to the table 2.

The work is machined by predetermined tools.

After the work is machined, the table 2 is transfered from the place in FIG. 12 to the other place in FIG. 11 in the following manner. The pin 93 of the clamp cylinder 92 is engaged with the chain hook 68 of the chain 66. The pallet 4 is unclamped as shown in FIG. 9. In this condition, the chain hook 90 engages the pallet hook 63. The table 2 is moved in the second direction of arrow X2 by means of the servomotor 10. At this time, the pin 93 of the clamp cylinder 92 engages the chain hook 68 of the chain 66. The chain 66 rotates clockwise so that the pinion moves in the second direction of arrow X2 in engaging with the rack 94. The slide member 69 moves in the direction of arrow X2 relative to the guide body 62 or the table 2. The chain hook 90 engages the pallet hook 63 so that the pallet 4 moves in the second direction of arrow X2 relative to the table 2 which moves in the direction of arrow X2.

Thus, the pallet 4 is transfered from the table 2 to the pallet table 30 as shown in FIG. 11.

By the before-mentioned manner, the pallet 4 is located at the table 2, and the work 5 is machined, and the pallet is transfered to the pallet stand 30.

The process to transfer the pallet 4 and the pallet 14 to the table 2 is explained by referring to FIG. 13 to 19.

Figure 13:
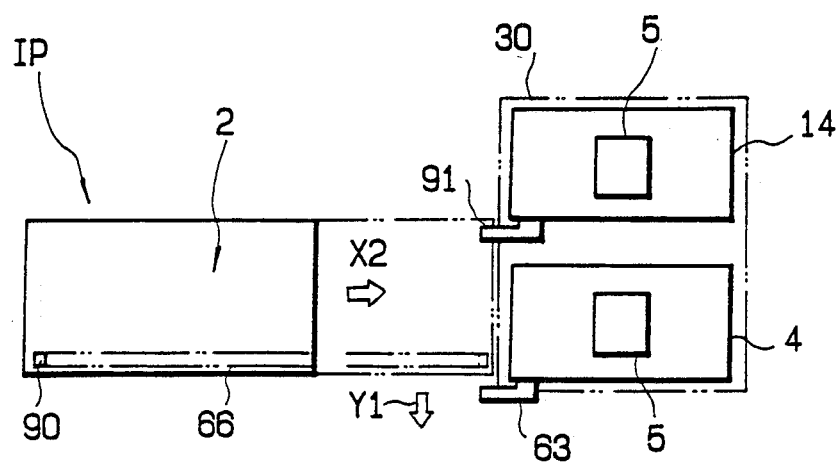
FIG. 13 to FIG. 19 are explanatory views showing pallet changing operations.

In FIG. 13, the pallets 4, 14 are located on the pallet stand 30, and the table 2 is located in the initial position IP. The chain hook 90 is located at the left end of the chain 66. The table 2 moves in the second direction of arrow X2, and then next in the first direction of arrow Y1.

Figure 14:
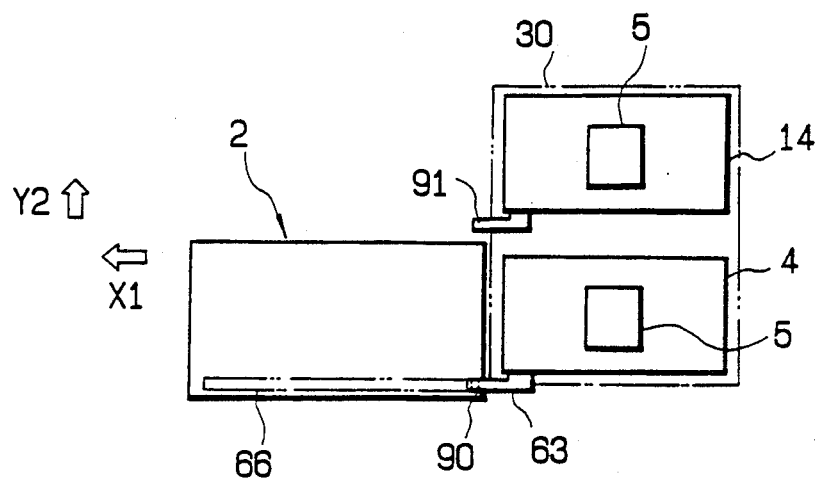

Accordingly, the chain hook 90 moves at the right end of the chain 66 as shown in FIG. 14 and engages the pallet hook 63. The table 2 is then moved in the first direction of arrow X1.

Figure 15:
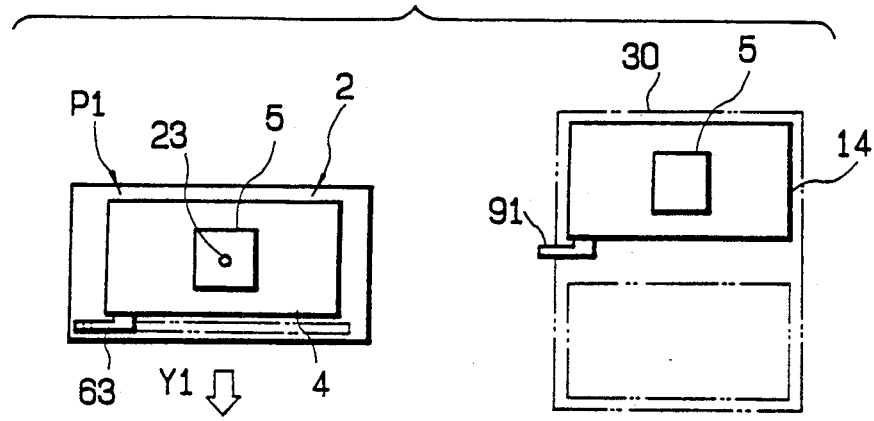

In FIG. 15, the pallet 4 is located on the table 2. The table 2 is located at the machining position P1. The spindle head 21 shown in FIG. 2 goes down so that a hole H (in FIG. 16) is machined in the work 5 by the tool 23.

Figure 16:
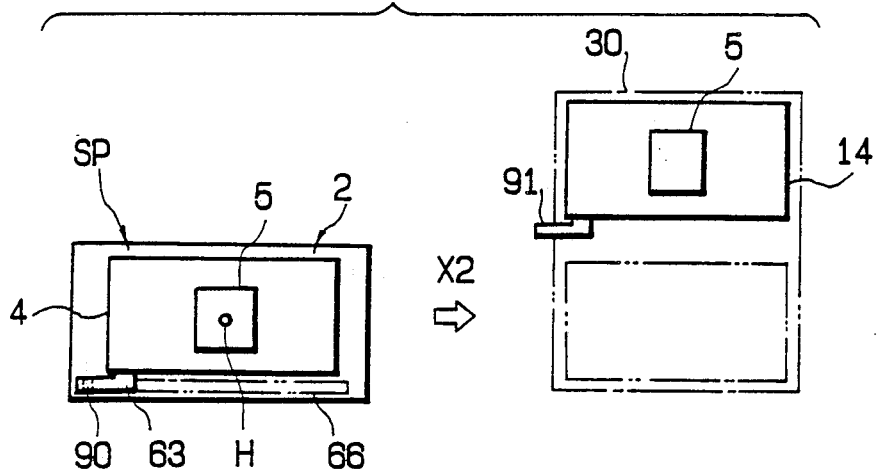

In FIG. 16, after the work 5 is machined, the table 2 is transfered to an another place SP. The table 2 moves in the second direction of arrow X2. When the table 2 moves, the pallet moves in the second direction of arrow X2 relative to the table 2.

Figure 17:
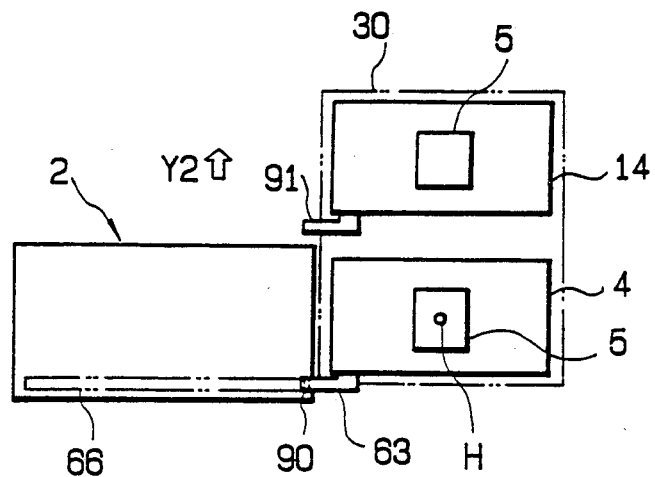

In FIG. 17, the pallet 4 is returned to the pallet stand 30. The table 2 is then moved in the direction of arrow Y2.

Figure 18:
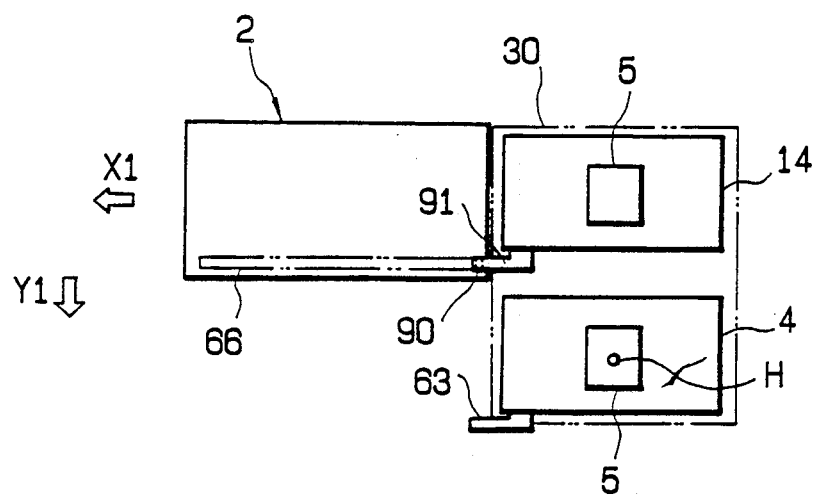

As seen in FIG. 18 the chain hook 90 disengages the pallet hook 63, and engages a pallet hook 91 of the pallet 14. The table 2 moves in the first direction of arrow X1. The table 2 moves so that the pallet 14 also moves in the first direction of arrow X1 relative to the table 2.

Figure 19:
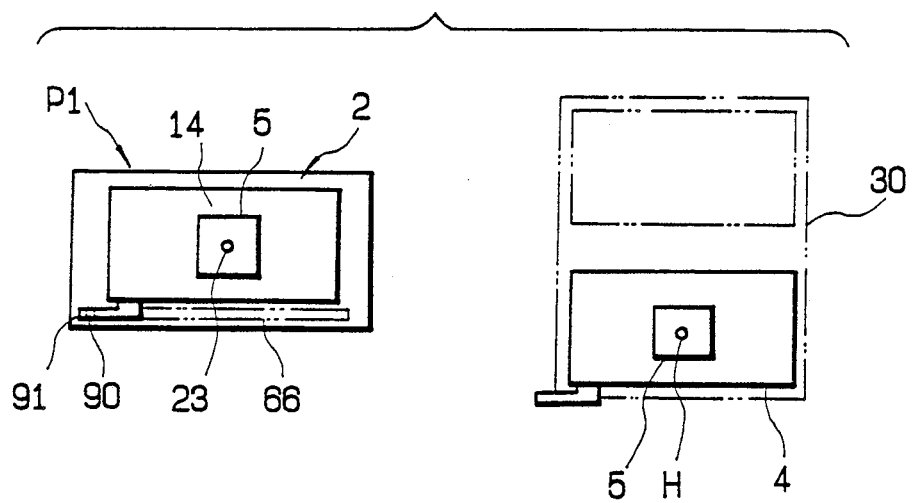

In FIG. 19 the table 2 is transfered at the machining position P1. The spindle head 21 in FIG. 2 goes down so that the work 5 is machined by a tool. In this a manner, the pallets 4 and 14 are located to the table 2 one by one, and the work 5 are machined.

This invention is not restricted to the described embodiment. In case of the before-mentioned vertical machining center, a plurality of pallets are provided on the pallet stand placed on the side of the machining center. The table moves along the X-axis so that a plurality of pallets are exchanged. The pallet table can be settled in front of the vertical machining center, and a plurality of pallets can be placed on the pallet table. In this case, the table moves along the Y-axis so that the pallets are exchanged.

Further, the pallet table can be settled on the side of a horizontal machining center, and a plurality of pallets can be placed on the pallet stand. In this case, the table moves along the X-axis so that the pallets are exchanged. The pallet stand may be settled in front of the horizontal machining center. In this case, the table moves along the Z-axis so that the pallets are exchanged.

The number of the pallets is not restricted to two. Three or more pallets may be used.

Furthermore, the pallet changer according to this invention can be applied to a general industrial machine such as a automatic tool assembly machine with X, Y table as well as a machine tool.

In the embodiment in the drawings, the table 2 moves along the Y-axis and accesses the pallet 4 and 14 one by one. Furthermore, the pallet 4 and 14 on the pallet stand 30 can be moved (along the Y-axis) relative to the table 2.

This invention is useful as a pallet changer, and is compact in size and its construction is simple.

I claim:

1. A pallet changer for a machine tool which employs pallets for supporting workpieces, said pallet changer comprising:
    (A) a support;
    (B) a table for mounting at least one of said pallets such that a pallet mounted on said table is movable along said table, said table being supported by the support and movable along a first axis;
    (C) pallet holding means for holding at least one of said pallets, said pallet holding means being positioned near the support so that pallets are transferrable between said pallet holding means and said table;
    (D) driving means for moving the table between the machine tool and the pallet holding means along said first axis, said driving means comprising a ball screw part having a nut fixed to the table and a feed screw connected to a servomotor;
    (E) transfer means for moving a pallet movably mounted on the table in a first direction along the first axis or a second direction along the first axis opposite to said first direction by means of a driving force of said driving means as the table moves in the first dirction or the second direction, said transfer means comprising:
        (i) a guide body fixed to the table;
        (ii) a slide body slidable along said first axis and supported by the guide body;
        (iii) a first sprocket positioned on a first portion of the slide body and a second sprocket positioned on a second portion of the slide body;
        (iv) a chain arranged between the first sprocket and the second sprocket; and
        (v) first engagement means for detachably engaging the chain and the pallet movably mounted on the table; and (F) chain moving means for moving the chain whereby the slide body slides relative to the table in said first direction or said second direction and the pallet movably mounted on the table slides in said first direction or said second direction as the table moves in said first direction or said second direction;

wherein said transfer means moves the pallet movably mounted on the table in the first or second directions only from the driving force of said drive means.

2. The pallet changer according to claim 1, wherein said chain moving means comprises a pinion connected to the slide body, a rack for engagement of the pinion fixed to the table, and second engagement means for engaging the chain only as one of said pallets is transferred between the table and the pallet holding means.

3. The pallet changer according to claim 2, wherein the second engagement means comprises a hydraulic cylinder.

4. The pallet changer according to claim 1, further comprising means for fixing a pallet mounted on the table during machining of a workpiece.

5. The pallet changer according to claim 1, further comprising means for moving the table along a second axis perpendicular to said first axis.

6. The pallet changer according to claim 5, wherein the first engagement means comprises a first member fixed to the chain and a second member fixed to one of said pallets for engaging the first member.

7. The pallet changer according to claim 6, wherein said first member and said second member can be disengaged by moving the table along the second axis.

8. The pallet changer according to claim 1, wherein the slide member includes means for adjusting tension of the chain.

9. The pallet changer according to claim 1, wherein the table includes a clamp plate for clamping a pallet to the table.

10. The pallet changer according to claim 1, wherein a machine tool machines workpieces supported by said pallets along a third direction perpendicular to both said first and second directions.

11. The pallet changer according to claim 1, wherein the pallet holding means comprises pallet fixing means for detachably fixing a pallet to the pallet holding means.

* * * * *